H. R. CALLAWAY.
POWER TRANSMISSION GEARING.
APPLICATION FILED FEB. 6, 1915.
1,186,745.
Patented June 13, 1916.
4 SHEETS—SHEET 4.
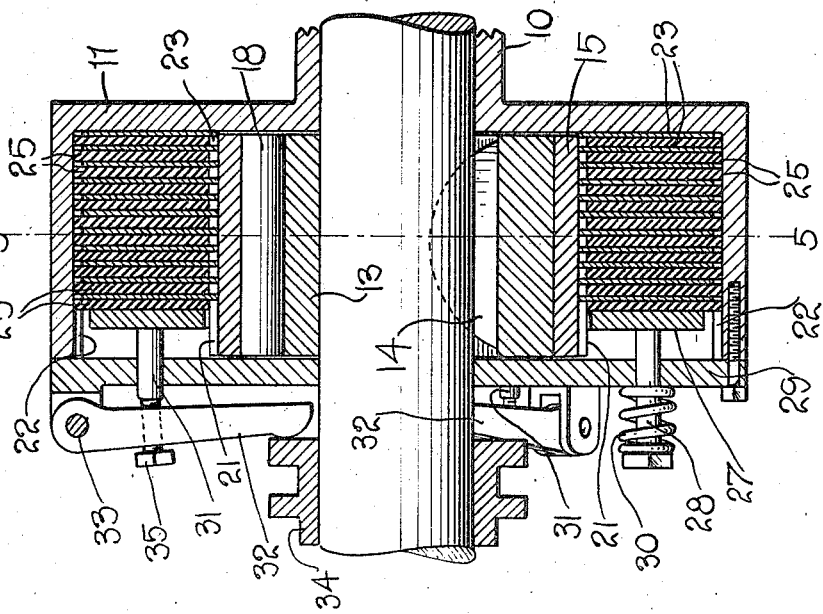
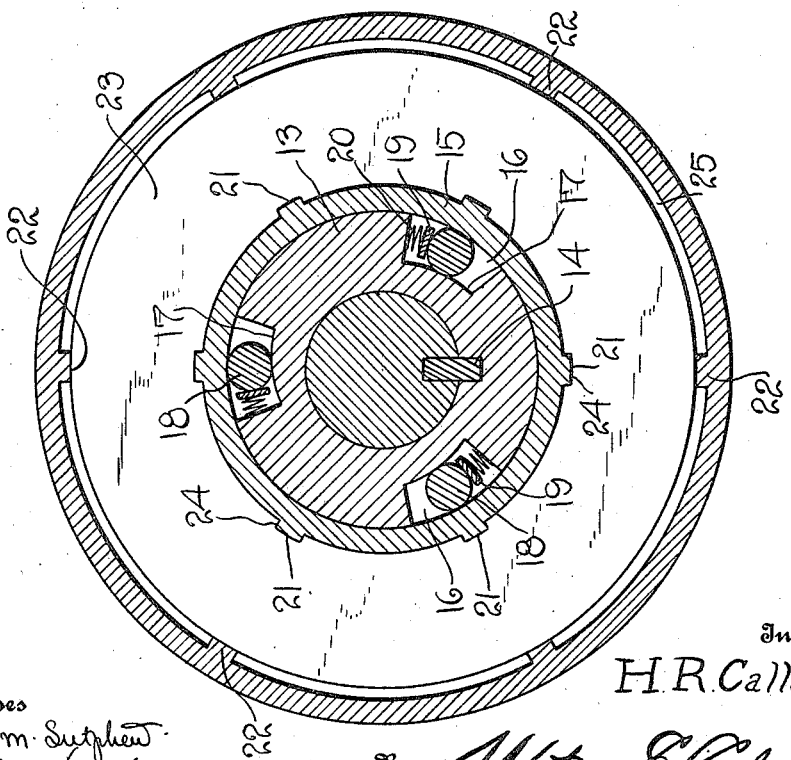
Witnesses
Robert M. Sutphen
A. L. Hind
Inventor
H. R. Callaway
By Watson E. Coleman
Attorney

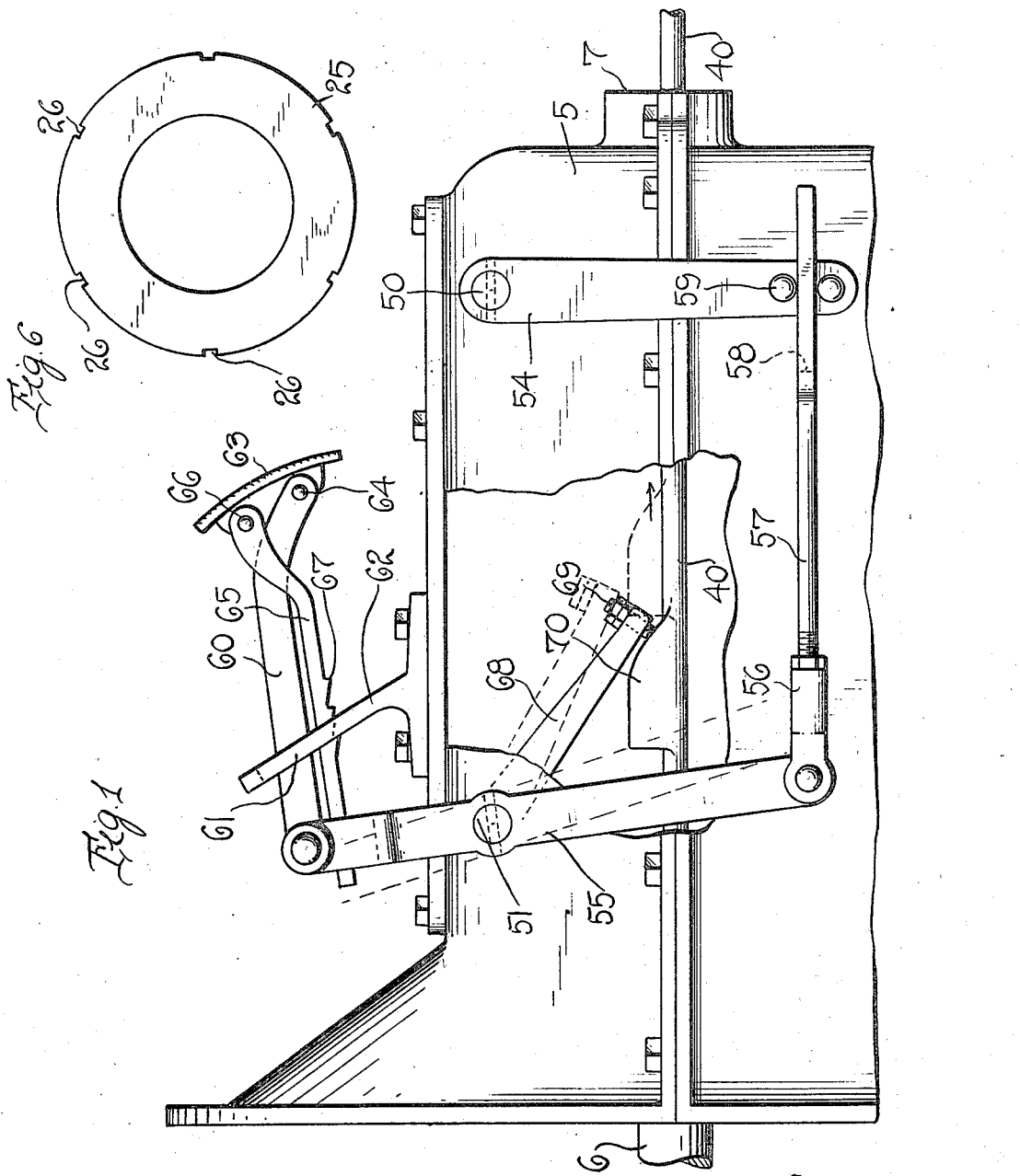

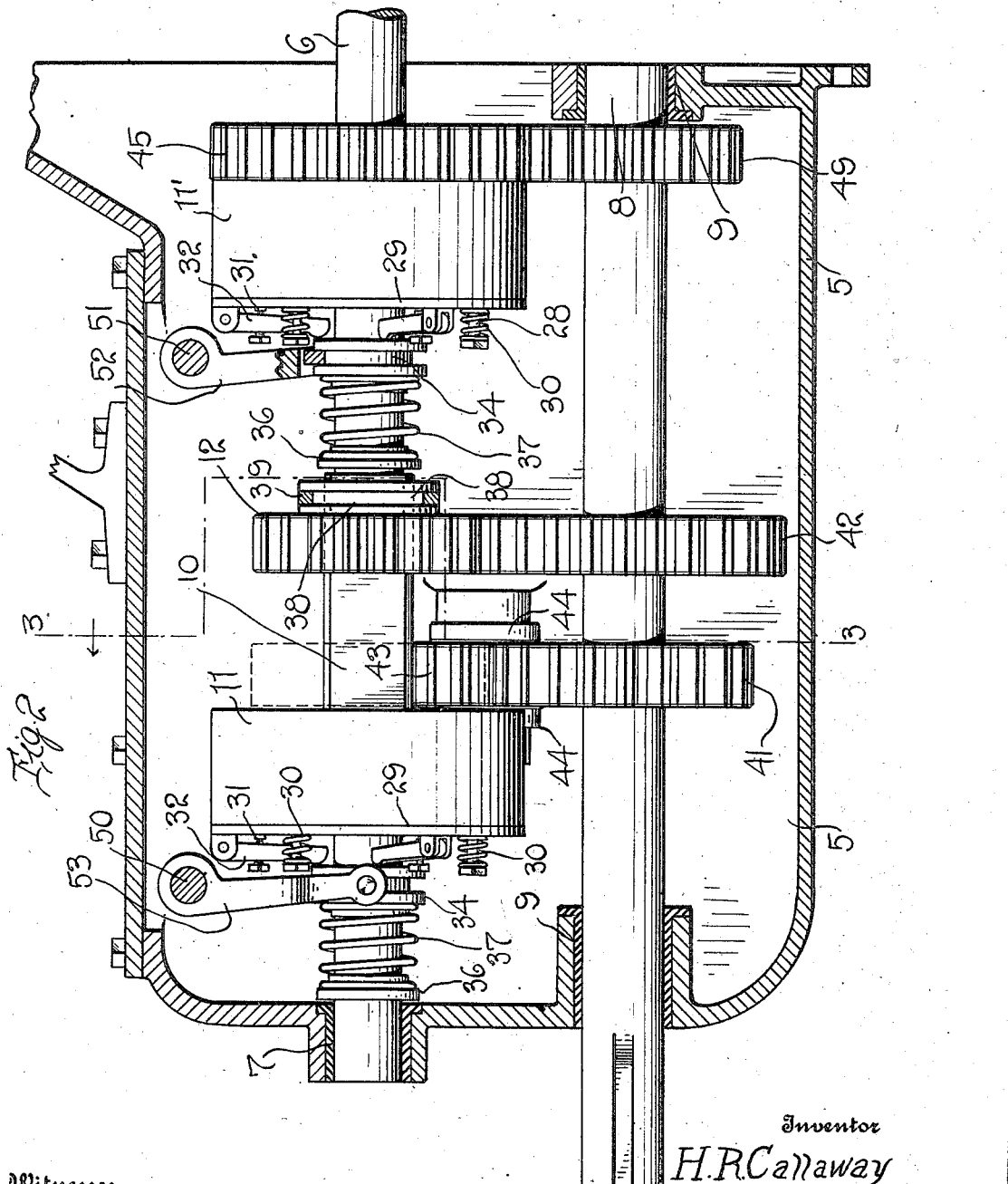

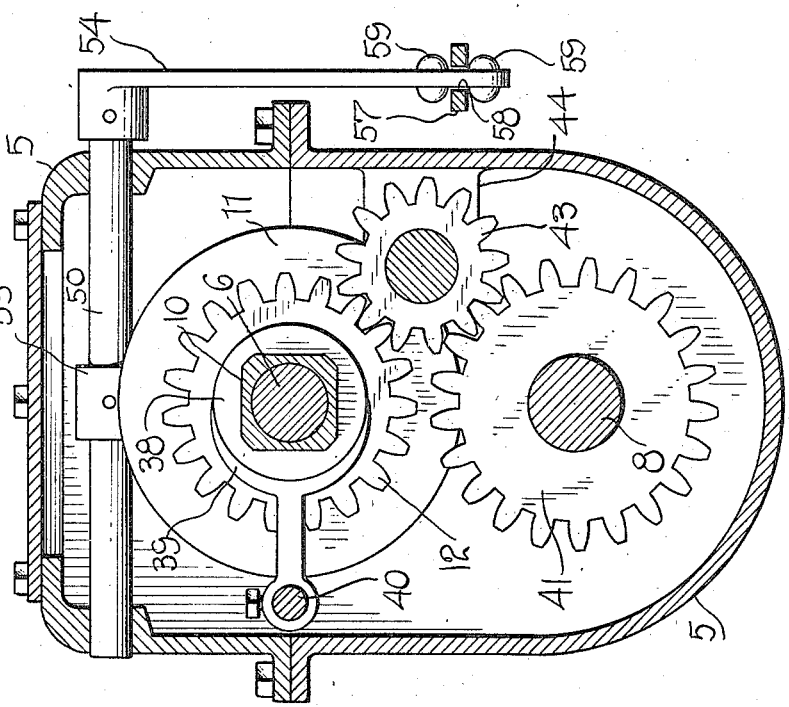
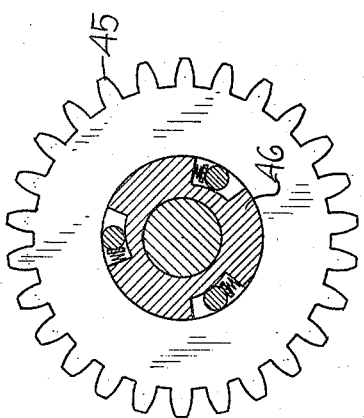
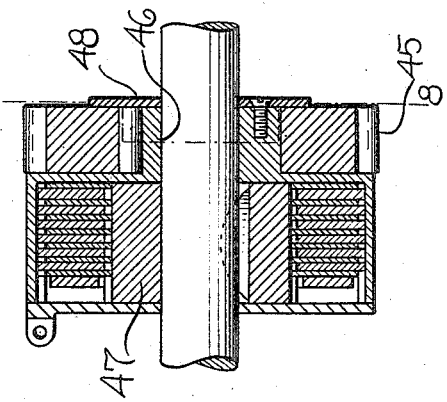

UNITED STATES PATENT OFFICE.

HOSEA R. CALLAWAY, OF DUNCAN, OKLAHOMA, ASSIGNOR OF ONE-FOURTH TO GEORGE F. WOMACK, OF DUNCAN, OKLAHOMA.

POWER-TRANSMISSION GEARING.

1,186,745.                    Specification of Letters Patent.     Patented June 13, 1916.

Application filed February 6, 1915. Serial No. 6,525.

*To all whom it may concern:*

Be it known that I, HOSEA R. CALLAWAY, a citizen of the United States, residing at Duncan, in the county of Stephens and State of Oklahoma, have invented certain new and useful Improvements in Power-Transmission Gearing, of which the following is a specification, reference being had to the accompanying drawings.

This invention relates to power transmission gearing, and more particularly to a multiple speed transmission gearing of that type commonly employed in the construction of motor vehicles.

The invention has for its primary object to provide an improved change-speed gearing which is of such construction that the gears at all times, during the forward drive, remain in mesh, and the lower speed gears are automatically released when the shift is made to the next higher speed gear in the series.

The invention has for a more particular object to provide a plurality of change-speed gears mounted upon the driving shaft, and a double clutch device associated with each of said gears, and means for releasing one of the clutches when the next higher speed gear on the drive shaft is locked thereon for the transmission of power.

The invention has for a further object to provide an improved mounting and arrangement of the combination low speed and reverse gear, manually operable means for shifting said latter gear, and means for preventing the operation of the clutch releasing means when said gear is in reverse position.

The invention has for a further general object to simplify and improve the construction of multiple speed transmission gearing, so that the same is rendered applicable, not only to motor vehicles, but also to threshing machines, traction engines, and all other machines of like character where it is desirable to vary the driving speed.

With the above and other objects in view, my invention consists in the novel features of construction, combination, and arrangement of parts to be hereinafter more fully described, claimed, and illustrated in the accompanying drawings, in which, Figure 1 is a side elevation with the transmission case partly broken away, showing the clutch releasing means and the shifting rod for the reverse gear; Fig. 2 is a vertical section; Fig. 3 is a section taken on the line 3—3 of Fig. 2; Fig. 4 is an enlarged vertical section through one of the double clutches; Fig. 5 is a section taken on the line 5—5 of Fig. 4; Fig. 6 is a detail elevation of one of the clutch disks; Fig. 7 is a vertical section illustrating the manner of applying the clutch to the higher speed gears; and Fig. 8 is a section taken on the line 8—8 of Fig. 7.

Referring in detail to the drawings, 5 designates the usual transmission gear case which is bolted or otherwise secured to the crank case of the engine. The driving shaft as shown at 6, is suitably coupled to the engine shaft or may constitute a continuation thereof. One end of this driving shaft is journaled in a suitable bearing 7 on the end wall of the case 5. The driven shaft 8 is also mounted in suitable bearings 9 and disposed below the driving shaft 6 and in parallel relation thereto.

I shall now proceed to describe in detail the construction of what I have termed in the claims a double clutch device, two or more of which are employed in accordance with the number of variable speed transmission gears with which the mechanism may be provided. The construction of this double clutch device is as follows: Upon the shaft 6, a sleeve 10, preferably of rectangular form in cross-section, is loosely engaged. At one of its ends, this sleeve is integrally formed with the wall of the hollow clutch drum 11; and upon the sleeve, the combined low speed and reverse gear 12 is mounted for longitudinal sliding movement. Upon the driving shaft 6, within the clutch drum 11, a clutch collar 13 is keyed, as indicated at 14, and an annulus 15 loosely surrounds this collar. The collar 13 is provided in its periphery, at spaced points, with circumferentially extending slots or recesses 16, the base walls 17 of which are inclined inwardly from one end of the respective slots toward the periphery of the driving shaft. In each of these slots 16, a clutch pin or roller 18 is loosely engaged and is co-extensive in length with the sleeve 13 and the annulus 15. The diameter of the clutch pins 18 is approximately equal to the depth of the recesses 16 at the center thereof. A metal bar, indicated at 19, is arranged in the deeper ends of these slots and is normally forced against the clutch pin by means of a coil spring 20. This spring acts to force the clutch pin toward the shallow end of the recess and cause the same to frictionally bind upon the base wall in the opposed inner face of the annulus 15 so as to prevent rotation of the annulus independent of said shaft and in a direction reverse thereto.

Upon the outer face of the annulus 15, a series of longitudinally extending ribs 21 are formed, and the inner face of the annular wall of the drum 11 is provided with a similar series of ribs 22. Metal clutch disks 23 are provided with notches 24 in their inner edges to receive the ribs 21, and these metal disks are arranged alternately with a series of fiber disks 25, the latter disks being provided with notches 26 in their outer edges to receive the ribs 22 on the wall of the clutch drum. Any desired number of these clutch disks may be employed, and at one end of the series of disks, a metal ring 27 is arranged within the drum 11 and bears against the end disk to force the several disks into frictional engagement with each other, and thereby lock the clutch drum 11 to the annulus 15. This annulus, in turn, being locked upon the driving shaft, through the medium of the clutch pins 18, rotates with said driving shaft. To the ring 27, a plurality of pins 28 are fixed at their inner ends, said pins projecting outwardly through openings in the face plate 29 of the clutch drum. Coil springs 30 are arranged upon the outer ends of these pins and bear against the face plate at one of their ends and against the heads of the pins at their other ends. These springs tend to force the pins outwardly through the plate 29 and thus relieve the pressure of the metal ring 27 against the clutch disks. Relatively short pins 31 are also fixed to the ring 27 and extend loosely through openings in the face plate 29. Dogs 32 are pivotally mounted at one of their ends upon the face plate 29, at the outer edge thereof, as indicated at 33. These dogs project inwardly toward the driving shaft and are engaged by a collar 34 which is loosely mounted upon said shaft. Each of the dogs carries an adjustable screw 35 for contact with the outer ends of the respective pins 31. Upon the driving shaft 6, a flange or collar 36 is fixed, against which one end of a coil spring 37 bears, the other end of said spring engaging the collar 34. This spring is considerably stronger than the springs 30, and it will, therefore, be apparent that the collar 34 bearing against the inner ends of the dogs 32, causes the adjusting means 35 to exert an inward pressure upon the pins 31, thereby forcing the metal ring 27 inwardly and frictionally engaging the several clutch disks with each other, so that the clutch drum is locked to the driving shaft.

The low speed and reverse gear 12 carries a peripherally grooved collar 38 with which a yoke 39, fixed upon a longitudinally shiftable rod 40, is engaged. This rod 40 is mounted for sliding movement through the case 5, and is actuated by a suitable lever (not shown). Upon the driven shaft 8, gears 41 and 42, of relatively different diameters, are fixed. With the gear 41, a power transmitting gear 43, mounted upon a suitable bearing arm 44 on the wall of the case 5, is engaged, and through the medium of the rod 40, the gear 12 may be shifted upon the rectangular sleeve 10 from a neutral position into engagement with the gear 42 to transmit power at a low speed to the driving shaft 8, or in a reverse direction and into mesh with the transmission gear 43 so that the shaft 8 may be rotated in a reverse direction to the driving shaft 6.

Upon the driving shaft 6, the high speed gear 45 is mounted. This gear is associated with a double clutch similar to that above described, with the exception that the clutch rollers 18 are not mounted within the drum case 11', but are arranged in recesses provided in the periphery of a hub extension 46 formed upon the end wall of the clutch drum (see Fig. 7). The gear 45 is loosely engaged upon this hub extension, which is the equivalent of the collar 13 above referred to. A collar 47 is, however, mounted within the clutch drum and keyed to the driving shaft, the annulus 15 being eliminated. This collar is formed with peripheral ribs opposed to the ribs on the wall of the drum, the series of clutch disks being arranged within the drum and slidably engaged upon said ribs in precisely the same manner as before referred to.

To the end of the hub extension 46 on the clutch drum, a plate 48 is secured, said plate being of sufficient diameter to extend over the face of the gear 45 and thus prevent longitudinal shifting movement of said gear with respect to the drum. The clutch disks are normally held in locked condition by mechanism identical with that above described, and corresponding reference numerals have, therefore, been applied to the several parts thereof. The gear 45 meshes with a relatively small gear 49 fixed upon the driven shaft 8. It will be understood that additional gears 45 and clutches therefor, successively increasing in diameter, may be mounted upon the driving shaft 6 so that rotation may be transmitted to the shaft 8 at any desired number of different speeds. In the operation of the mechanism, however, only the gear through which the driving power is imparted to the shaft 8, remains locked upon the driving shaft 6, the other gears being automatically released in a manner which will now be described.

In the side walls of the case 5, the spaced transversely disposed rock shafts 50 and 51, respectively, are mounted, and each of these shafts carries a depending yoke member 52 and 52, respectively which is engaged with one of the collars 34. One end of the shaft 50 projects exteriorly of the case 5, and to the same, the upper end of an arm 54 is fixed. The corresponding end of the shaft 51 also extends exteriorly of the transmission case, and upon the same the lever 55 is secured intermediate of its ends. A head 56 is pivotally connected to the lower end of this lever and a rod 57 has threaded engagement at one of its ends in said head. The other end of this rod 57 is provided with a longitudinal slot indicated at 58, through which the lower end of the arm 54 is disposed. Upon opposite sides of said arm and above and below the rod 57, projections 59 are formed to retain said rod in connection with the arm and hold the same against vertical movement with respect thereto. To the upper end of the lever 55, a pedal bar 60 is pivotally connected. This bar extends through a slot 61 in a bracket plate 62 which is fixed upon the top wall of the case 5. The other end of the bar 60 has a tread plate 63 pivoted thereto, as at 64. A rod 65 is also pivotally connected to this tread plate above the connection of the bar 60 thereto, as shown at 66, said rod extending through the slot in the bracket plate 62 below the bar 60. The other end of this rod 65 extends through the bifurcated upper end of the lever 55 to which the pedal bar 60 is pivotally connected. The rod 65 is formed on its lower edge with a series of teeth 67 which are adapted to engage upon the lower edge of the slot 61 in the plate 62 and prevent relative movement of said rod and the bar 60 in one direction. Within the crank case 5, an obliquely disposed arm 68 is fixed to the shaft 51. This arm carries an adjustable screw or bolt 69 for engagement upon an upwardly projecting lug 70 formed upon the longitudinally shiftable rod 40 which actuates the reversing gear 12, for a purpose to be later explained.

Having now described the several structural features of my invention, its operation will be understood as follows:—Assuming that the gear 12 is in its neutral position, the operator presses upon the tread plate 63 with his foot, and forces the rod 65 and bar 60 through the slot in the plate 62 until the innermost tooth 67 on the rod 65 engages over the edge of the slot 61. The shafts 50 and 51 have thus been rocked to shift the collars 34 so that the springs 30 may act to release the clutches. Owing to the provision of the rod 57 and the arm 54 which have a relative initial movement, it will be understood that the collar 34 of the clutch, provided for the high speed gear 45, is moved twice the distance upon the driving shaft 6 that the other collar 34 is moved. If it is now desired to drive at a low speed, the rod 40 is shifted to move the gear 12 into engagement with the gear 42. The operator now lifts the rod 65 and arm 60 by forcing upwardly upon the tread plate 63 so that the shafts 50 and 51 rotate in a reverse direction, and the arm 54 on the end of the shaft 50 assumes a vertical position. The collar 34 of the clutch for the sleeve 10, is forced inwardly by the spring 37 to engage the dogs 32 and frictionally engage the several clutch disks with each other, thereby locking the drum and the sleeve to the driving shaft. The other clutch for the gear 45, however, remains in released condition. The central tooth 67 on the lower edge of the rod 65 is engaged with the lower edge of the slot 61 when the parts are in this position. When it is desired to transmit power at a high speed, the operator again lifts the toothed edge of the rod 65 from engagement with the bracket plate 62 so that the shaft 51 has a further rocking movement, and the other of the clutch collars 34 is forced by the spring 30 to engage the disks of the clutch for the gear 45, thus locking this gear to the driving shaft, while the gear 12 remains in mesh with the gear 42. By means of the double clutch arrangement, however, it will be seen that the gear 12 and sleeve 10, together with the clutch drum, may rotate independently of the shaft 6, the clutch disks on the annulus 15, together with the drum, rotating around the fixed collar 13 on the driving shaft. In this position of the parts, the end notch 67 in the rod 65, is engaged with the bracket plate 62 and the operating mechanism for the clutches is in the condition shown in Fig. 1. In order to transmit power to the shaft 8 in a reverse direction, it is first necessary to release both of the clutches by pressure upon the tread plate 63, and thus shift the rod 40 to slide the gear 12 on the sleeve 10 and engage the same with the transmission gear 43. The operator then actuates the pedal device to permit the shaft 50 to rotate, whereby the clutch of the sleeve 11 will lock said sleeve to the driving shaft, the central notch in the rod 65 being engaged with the bracket plate 62. When the rod 40 is thus shifted, the upstanding lug 70 thereon is disposed in the dotted line position shown in Fig. 1, and the screw 69 on the arm 68 is engaged upon said lug. In this manner, I have provided a safety guard to prevent a further rocking movement of the shaft 51 in the event that the rod 65 should be accidentally released from the plate 62, whereby the high speed gear 45 would be locked upon the driving shaft and the mechanism thus injured. It will be understood that, while I have shown, in the accompanying drawings, a transmission gearing having only a two-speed forward drive, any additional number of the gears 45 and clutches therefor, may be provided, the number of teeth in the rod 65 being correspondingly increased, and the proper obvious connections between the arms on the several shafts 50 and the lever 55, of course, provided. By providing each of the gears 45 with the double clutch device, it is manifest that there is no break in the continuity of driving power from the shaft 6 to the shaft 8 when the shift is made from one driving speed to the other. The locking of one speed gear upon the shaft 6 and the automatic release of the next lower speed gear for rotation independently of the shaft, takes place simultaneously. The advantage of the double clutch arrangement is further apparent in the application of the transmission gearing to motor vehicles, in that it is unnecessary to cut off the motive power when coasting down an incline and the car is running at a greater speed than the driving power of the engine. The engine may continue to run and the shaft 6 be rotated at the engine speed while the several gear elements on said shaft rotating independently thereof, permit of the excessive speed of the vehicle, without liability of stripping the gear teeth or otherwise injuring the mechanism. Heretofore, it has been necessary in making the change from one speed to another, to cut off the motive power and manipulate a series of levers to release the several change-speed gears. In addition to the loss of power attendant upon thus releasing the power, the car body is subjected to a greater or less jar or vibration which results from the resumption of application of the motive power after the proper shifting of the gears has been made. By means of the present invention, however, I have obviated these several deficiencies in pre-existing multiple speed transmission gearing.

From the foregoing description, taken in connection with the accompanying drawings, the construction, manner of operation, and several advantages of the mechanism will be clearly and fully understood.

It will be seen that I have produced a very effective and reliable power transmission gearing, but one which is exceedingly simple in its construction and capable of manufacture at comparatively small cost.

It is, of course, manifest that the arrangement and mounting of the gear elements, as well as the form and construction of the several parts of the clutch mechanism, may be variously modified in order to adapt my improved gearing for particular uses. I do not, therefore, desire to be limited to the precise construction and arrangement of the several details above referred to, but reserve the privilege of resorting to all such legitimate modifications as may be fairly embodied within the spirit and scope of the invention as claimed.

Having thus fully described my invention, what I desire to claim and secure by Letters Patent is:—

1. In a multiple speed transmission gearing, driving and driven shafts, variable speed gears loosely mounted upon the driving shaft, a locking clutch for each variable speed gear, complementary gears fixed on the driven shaft, a reversing gear, a gear on the driven shaft in constant mesh therewith, means for shifting the low speed gear on the driving shaft into or out of engagement with the reversing gear, manually operable means for actuating the locking clutches of the varible speed gears, and means for precluding the operation of the clutches of the variable speed gears when the low speed gear is shifted to its reversing position.

2. In a multiple speed transmission gearing, driving and driven shafts, variable speed gears loosely mounted upon the driving shaft, a locking clutch for each variable speed gear, complementary gears fixed on the driven shaft, a reversing gear, a gear on the driven shaft in constant mesh therewith, an operating rod for shifting the low speed gear on the driving shaft into or out of engagement with said reversing gear, manually operable means for actuating the locking clutches to successively lock the variable speed gears upon the driving shaft, and an element movable with said means and adapted to engage said operating rod when the low speed gear is in reverse position to prevent the actuation of the clutches for the variable speed gears.

3. In a multiple speed transmission gearing, driving and driven shafts, a combined low and reverse speed gear slidably mounted upon said driving shaft, a high speed gear loosely mounted upon the driving shaft, gears on the driven shaft engaged by the gears on the driving shaft, an additional gear on the driven shaft, a power transmitting gear meshing with the latter gear, means for shifting the said low speed and reverse gear into or out of engagement with the latter gear or one of the gears on the driven shaft, locking clutches normally locking the gears on the driving shaft against independent rotation, and manually operable means for actuating all of the clutches to release the several gears on the driving shaft, and then successively lock said gears from the low to the high speed gears upon the driving shaft, said clutches permitting of the independent rotation of the low speed gear when the power is being transmitted through the high speed gear on the driving shaft.

4. In a multiple speed transmission gearing, driving and driven shafts, a combined low and reverse speed gear slidably mounted upon said driving shaft, a high speed gear loosely mounted upon the driving shaft, gears on the driven shaft engaged by the gears on the driving shaft, an additional gear on the driven shaft, a power transmitting gear meshing with the latter gear, means for shifting the low speed and reverse gear into or out of engagement with the latter gear or one of the gears on the driven shaft, locking clutches normally locking the gears on the driving shaft against independent rotation, manually operable means for actuating all of the clutches to release the several gears on the driving shaft, and then successively lock said gears from the low to the high speed gears upon the driving shaft, said clutches permitting of the independent rotation of the low speed gear when the power is being transmitted through the high speed gear on the driving shaft, and means to positively prevent the actuation of the clutch for the high speed gear and the transmission of power through said gear, when the low speed gear has been shifted to reverse position and rotation is being transmitted from the driving shaft in a reverse direction to the driven shaft.

In testimony whereof I hereunto affix my signature in the presence of two witnesses.

HOSEA R. CALLAWAY.

Witnesses:
 E. S. RHOADES,
 M. L. ROCHE.